Aug. 25, 1931.   G. PREIS   1,820,246

GEAR

Filed Sept. 17, 1928

Inventor:
George Preis

Patented Aug. 25, 1931

1,820,246

UNITED STATES PATENT OFFICE

GEORG PREIS, OF WEINBOHLA, GERMANY

GEAR

Application filed September 17, 1928, Serial No. 306,566, and in Germany September 22, 1927.

The present invention relates to gear wheels of the cylindrical and bevel type and has for its object to produce the same effect by means of straight teeth as with spiral, oblique or conical gearings and to eliminate the axle pressure connected therewith.

To insure noiseless running of gears the prior art provided spiral, oblique or conical gearings which, unlike straight teeth, do not get into engagement with their full length at once, but mesh gradually. The advantages gained by this arrangement are, however, made illusory to a large extent by the axle pressure developed which makes it necessary to attach the gears in a special way.

This invention deals with a gear which, under almost identical contact conditions, affords the same advantages and eliminates axle pressure, the essential feature of the invention consisting in correcting the teeth by addition or subtraction so that the top lines of the teeth and the bottom lines of the notches become uniformly concave, convex or angular.

Figure 1:
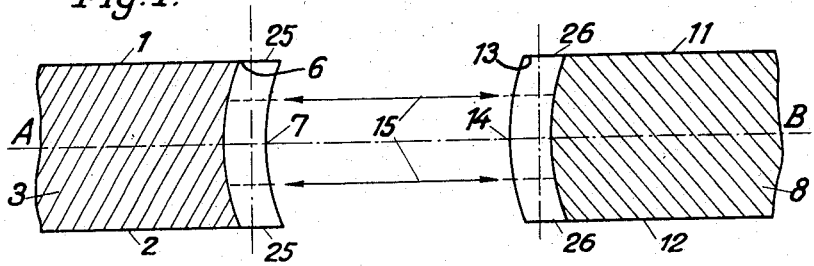
Figure 2:
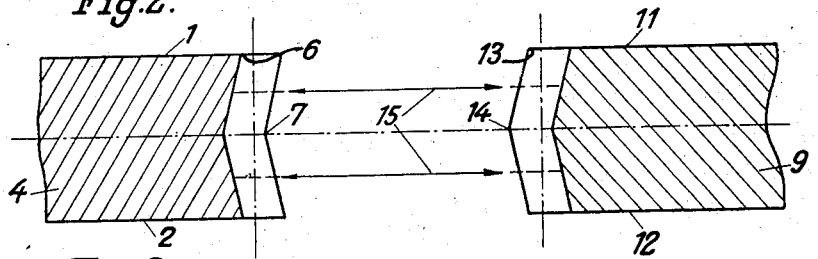
Figure 3:
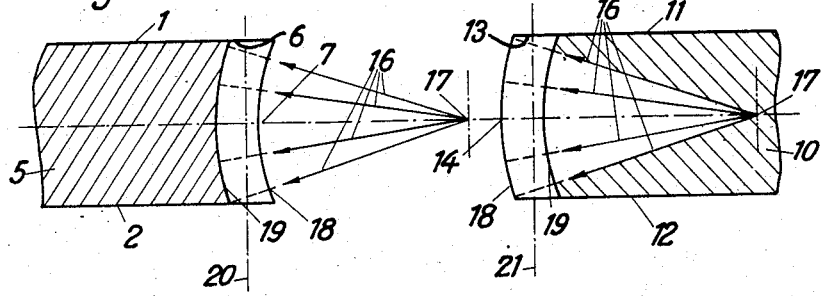

Three forms of the invention are shown in the accompanying drawings, in which Figure 1 discloses parts of a pair of meshing gears with a correction of the teeth in a radial direction of the wheels; Fig. 2, parts of a pair of meshing gears with angular teeth; Fig. 3, parts of a pair of meshing gears with teeth whose top lines and bottom lines of the notches of both wheels being curved as concentric circles; and Fig. 4, a section of the pair of gears shown in Fig. 1 on the line A—B.

In order to cause two gears to mesh as if provided with spiral or angular teeth, the correction of the teeth of both gears, according to the invention, is arranged so that the top lines and bottom lines are like those shown in Figs. 1-3.

This arrangement can be made at will, i. e., starting from the middle on the outside faces of the wheels only or, starting from the side faces, of the wheels in the middle only and either in a circular (Fig. 1) or angular (Fig. 2) manner. Meshing will always take place by bringing one or more points into engagement until gradually the entire width of the tooth is covered while the disengagement is effected in a similar manner so that finally only one or more points are in contact.

In the pairs of gears shown in Figs. 1 to 4 the correction has been arranged in the following way:

It is assumed that the standard height of the addendum above the line 20 is 4 mm. On the outside faces 1 and 2 of the gears 3, 4, and 5 the addendum 6, according to the invention, is by addition 5.5 mm. high, but only 2.5 mm. by subtractions in the middle 7. In the gears 8, 9, and 10 on the outside face 11 and 12 of the wheels the addendum 13 lying above the line 21 is 2.5 mm. high by subtraction and 5.5 mm. in the middle by addition 14.

Therefore, a gear having specially corrected teeth requires a counter-gear possessing the same correction in an opposite sense, so that the top lines 18 of the teeth and the bottom lines 19 of the notches in one wheel extend in a direction opposite to the top lines of the teeth and the bottom lines of the notches in the other wheel.

The flank faces of teeth can be formed either according to Figs. 1 and 2 by correcting the whole width of the gear in radial direction as indicated by the arrows 15 or by a correction so that the top lines 18 of the teeth and the bottom lines 19 of the notches of both wheels being curved as concentric circles about a common center 17 with desired rows 16, the said center 17 being outside the top line of one wheel 5 and inside the bottom line 19 of the other wheel 10.

If the top and bottom lines are formed this way, the gears show in the radial plane where the center 17 lies a point contact whence, towards the side faces of the wheels the contact becomes increasingly greater so that the manner of engagement is similar to that found in gears having spiral or conical gearing.

Figure 4:
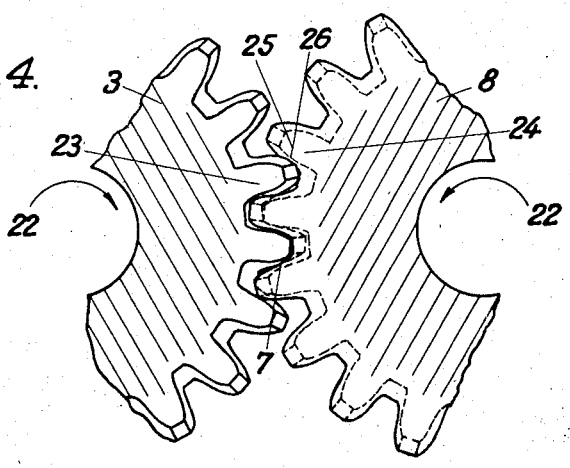

If a pair of gears toothed in the ways indicated is brought into engagement, the meshing of the teeth takes place in the manner indicated in Fig. 4.

If the wheels 3 and 8 are turned in the direction of the arrow 22, the teeth 23 and 24 get at first into contact at the points 25 and 26 on the said faces. When the turning of the wheels continues, the teeth cover each other gradually with their whole width. When the disengagement begins, the teeth gradually get out of contact, beginning with the points 25 and 26, until finally only the middle points 7 are in touch with one another. If the gears are turned in opposite direction, the process is reversed.

The invention is not limited to any special type of gear wheels, but can be applied to all kinds of spur and bevel gears.

I claim:—

1. Gear comprising two cooperating wheels, the teeth being corrected by addition or subtraction, the top lines of the teeth and the bottom lines of the notches in one wheel extending in a direction opposite to the top lines of the teeth and the bottom lines of the notches in the other wheel.

2. Gear comprising two cooperating wheels, the teeth being corrected by addition or subtraction, the top lines of the teeth and the bottom lines of the notches in one wheel being curved convexly and the top lines of the teeth and the bottom lines of the notches in the other wheel being concavely formed.

3. Gear comprising two cooperating wheels, the teeth being corrected by addition or subtraction in a radial direction of the wheels, the top lines of the teeth and the bottom lines of the notches of one wheel being convexly formed and those of the other wheel, concavely.

4. Gear comprising two cooperating wheels, the teeth being corrected by addition or subtraction, the top lines of the teeth and the bottom lines of the notches of both wheels being curved as concentric circles about a common center, the said center being outside the top line of one wheel and inside the bottom line of the other wheel.

In testimony whereof I have affixed my signature.

GEORG PREIS.